(12) United States Patent
Parrish et al.

(10) Patent No.: US 6,434,703 B1
(45) Date of Patent: Aug. 13, 2002

(54) EVENT INITIATION BUS AND ASSOCIATED FAULT PROTECTION FOR A TELECOMMUNICATIONS DEVICE

(75) Inventors: Brent K. Parrish, Hollis; Ronald A. McCracken, Pelham; John J. Fernald, Nashua, all of NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/328,173

(22) Filed: Jun. 8, 1999

(51) Int. Cl.[7] .............................. G06F 13/00; G06F 1/24
(52) U.S. Cl. ............................ 713/310; 713/1; 710/301
(58) Field of Search ...................... 710/8–19, 100–104; 713/1, 2, 100, 300–340

(56) References Cited

U.S. PATENT DOCUMENTS 6,101,322 A * 8/2000 Goodrum et al. ........... 395/282
6,138,194 A * 10/2000 Klein et al. ................. 713/302
6,321,174 B1 * 11/2001 Chen et al. ................. 703/122

* cited by examiner

Primary Examiner—Sumati Lefkowitz
(74) Attorney, Agent, or Firm—Baker Botts L.L.P.

(57) ABSTRACT

A telecommunications device includes an event initiation bus, at least one card coupled to the bus that can execute an event, and at least one controller also coupled to the bus that can communicate an event code value to the card using the bus. The event code value indicates the event is to be executed. The controller determines an event code value from the bus, compares the communicated event code value with the determined event code value, and transmits an event strobe signal to the card using the bus if the communicated event code value matches the determined event code value. The event strobe signal enables execution of the event and the card executes the event in response to the event code value and the event strobe signal. In a particular embodiment, the device is a switching unit having a high availability backplane environment.

20 Claims, 3 Drawing Sheets

EVENT INITIATION BUS AND ASSOCIATED FAULT PROTECTION FOR A TELECOMMUNICATIONS DEVICE

RELATED APPLICATIONS

This application is related to:

U.S. application Ser. No. 09/328,171 for a "LOCAL AREA NETWORK AND MESSAGE PACKET FOR A TELECOMMUNICATIONS DEVICE," filed Jun. 8, 1999 by Brent K. Parrish, Christopher A. Meltildi, John P. Barry, and Lee C. Stevens;

U.S. application Ser. No. 09/328,038 for a "HIGH AVAILABILITY LOCAL AREA NETWORK FOR A TELECOMMUNICATIONS DEVICE," filed Jun. 8, 1999 by Brent K. Parrish, Ronald A. McCracken, and John J. Fernald;

U.S. application Ser. No. 09/327,700 for a "TDM SWITCHING SYSTEM AND ASIC DEVICE," filed Jun. 8, 1999 by Brent K. Parrish and Werner E. Niebel;

U.S. application Ser. No. 09/327,971 for a "PROTECTION BUS AND METHOD FOR A TELECOMMUNICATIONS DEVICE," filed Jun. 8, 1999 by Brent K. Parrish and John P. Barry;

U.S. application Ser. No. 09/328,031 for a "FRAME SYNCHRONIZATION AND FAULT PROTECTION FOR A TELECOMMUNICATIONS DEVICE," filed Jun. 8, 1999 by Brent K. Parrish;

U.S. application Ser. No. 09/328,172 for a "TRANSITIONING A STANDARDS-BASED CARD INTO A HIGH AVAILABILITY BACKPLANE ENVIRONMENT," filed Jun. 8, 1999 by Brent K. Parrish, Michael J. Taylor, and Michael P. Colton; and U.S. application Ser. No. 09/330,433 for a "CLOCK SYNCHRONIZATION AND FAULT PROTECTION FOR A TELECOMMUNICATIONS DEVICE," filed Jun. 8, 1999 by Brent Parrish.

TECHNICAL FIELD OF THE INVENTION

This invention relates to the field of telecommunications, and more particularly to an event initiation bus and method for a telecommunications device.

BACKGROUND OF THE INVENTION

Many telecommunications devices include backplanes for transmitting digital information between components of the devices. For example, a telecommunications switching system might include a backplane for transmitting digital data representing voice signals between cards associated with incoming and outgoing ports. Typically, such a system would also include one or more mechanisms to initiate certain types of events during operation of the system, for example, to reset a card, to electrically isolate a card from other cards, or to power a card on or off. Successful operation of the system in many instances will depend heavily upon the ability of these mechanisms to reliably initiate such events when they are desired, without inadvertently initiating such events when they are not desired, to meet the often stringent availability, flexibility, and other requirements placed on the system.

As the telecommunications industry continues to dominate the growth of the global economy, meeting availability, flexibility, and other requirements placed on switching and other systems has become increasingly important. High availability is generally considered as exceeding 99.999 percent availability, amounting to less than approximately five minutes of "down time" per year, and generally requires a system to have the ability to autonomously handle and contain certain faults, such as failure of an event initiation mechanism, without immediate human intervention. High availability has increasingly become a de facto if not explicit competitive requirement for many telecommunications manufacturers.

However, prior event initiation techniques are often inadequate to meet these requirements. As the density of cards within telecommunications devices continues to increase, reliably initiating an event associated with one or more selected cards, while preventing an event from being undesirably initiated with respect these or any other cards, has become increasingly important. For example, using previous techniques, a redundant bus was typically required to limit propagation of a failure associated with a primary bus. Furthermore, even given a switchover from the primary to the redundant bus, one or more desired events may have gone uninitiated and one or more undesired events may have been initiated. Moreover, redundant buses typically increase the cost, increase the complexity, and reduce available pins and other resources within systems incorporating such techniques. Deficiencies of previous techniques may be particularly apparent when they are incorporated in high availability backplane environments of telecommunications devices.

SUMMARY OF THE INVENTION

According to the present invention, disadvantages and problems associated with event initiation strategies in a backplane environment of a telecommunications device have been substantially reduced or eliminated.

According to one embodiment of the present invention, a telecommunications device includes an event initiation bus, at least one card coupled to the bus that can execute an event, and at least one controller coupled to the bus that can communicate an event code value to the card using the bus. The event code value indicates the event is to be executed. The controller determines an event code value from the bus, compares the communicated event code value with the determined event code value, and transmits an event strobe signal to the card using the bus if the communicated event code value matches the determined event code value. The event strobe signal enables execution of the event and the card executes the event in response to the event code value and the event strobe signal. In a particular embodiment, the device is a switching unit having a high availability backplane environment.

The event initiation bus and related components of the present invention provide a number of important technical advantages over prior strategies, particularly within a high availability backplane environment of a telecommunications device. The present invention provides multiple layers of fault protection, including both the detection and handling of faults associated with the event initiation mechanism, helping to prevent single points of failure from propagating in the device, reduce down time, and satisfy high availability requirements. In particular, the present invention prevents a failure associated with an event initiation bus or a related component from causing a desired event to go uninitiated, from causing an undesired event to be incorrectly initiated, and from propagating. These benefits are accomplished without requiring a redundant bus configuration typically associated with prior event initiation mechanisms. As a result, the event initiation bus and related components of the present invention are well suited for incorporation in a wide variety of switching and other modem telecommunications devices. Other important technical advantages will be readily apparent to those skilled in the art.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
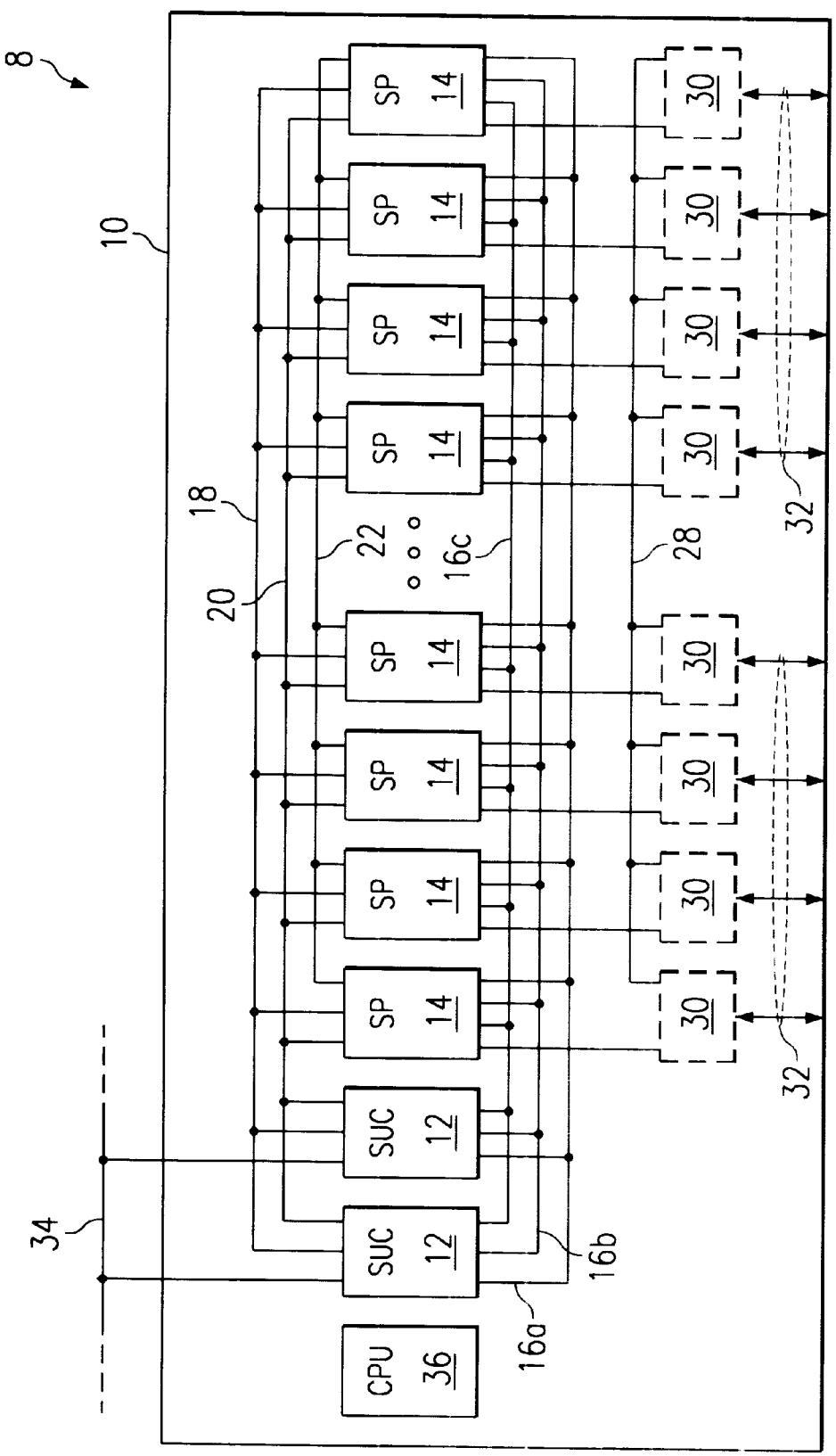
FIG. 1 illustrates an exemplary system including at least one switching unit having reset, isolate, and power event initiation buses in accordance with the present invention.

FIG. 1 illustrates an exemplary system 8 including one or more switching units 10. In one embodiment, each switching unit 10 is a programmable switching unit that switches time division multiplexed (TDM), packet-based, or other suitable digital signals associated with voice, data, or other appropriate traffic between incoming and outgoing ports, lines, trunks, or other suitable telecommunications network interfaces. In general, switching unit 10 may operate at least in part subject to control of suitable software within one or more associated host computers and may be coupled to such host computers using one or more suitable communications links. Although switching unit 10 is discussed, those skilled in the art appreciate that the present invention may apply similarly to a variety of other telecommunications devices and that the present invention encompasses all such applications.

In one embodiment, switching unit 10 includes two or more redundant switching unit controllers (SUC) 12 coupled to each other and to multiple service providers (SP) 14 using reset bus 16a, isolate bus 16b, and power bus 16c, referred to singularly as event generation bus 16 and collectively as event generation buses 16. Reference herein to event generation bus 16 or event generation buses 16 is intended to include reference to any one or more of reset bus 16a, isolate bus 16b, and power bus 16c, as appropriate. Each switching unit controller 12 and each service provider 14 is a card that supports appropriate integrated circuits, buses, circuitry, and other suitable electrical components and that may be shelf-mounted, rack-mounted, or otherwise removably installed within switching unit 10 in accordance with particular needs. Switching unit controllers 12 generally cooperate to control selected aspects of the operation of service providers 14 and other components of switching unit 10. Switching unit controllers 12 and service providers 14 use control bus 18 to communicate command, control, and administrative messages during the operation of switching unit 10. Control bus 18 and its associated physical layer protocol provide a local area network coupling switching unit controllers 12 and service providers 14 in the backplane environment of switching unit 10, which may be a high availability backplane environment. Control bus 18 and its operation are described more fully in copending U.S. application Ser. Nos. 09/328,171 and 09/328,038. In addition to event initiation buses 16 and control bus 18, switching unit controllers 12 and service providers 14 may be coupled to one another using a synchronization bus 20, described more fully in copending U.S. application Ser. Nos. 09/328,031 and 09/330,433, according to the particular needs of switching unit 10.

In general, service providers 14 communicate digital signals with one another using a backplane, midplane, or other suitable switching fabric 22 that in a particular embodiment supports up to 16,384 time slots, corresponding to the as many as 16,384 ports associated with switching unit 10. Service providers 14 communicate between the backplane 22 and associated network interfaces to allow switching unit 10 to switch digital signals associated with these interfaces. Service providers 14 may communicate with network interfaces of a single or multiple types, for example only and not by way of limitation, T1 interfaces, E1 interfaces, Integrated Services Digital Network (ISDN) interfaces, Signaling System 7 (SS7) interfaces, Optical Carrier level-3 (OC-3), or any other suitable interfaces, in any combination. Service providers 14 may have a peer-to-peer or any suitable hierarchical relationship. Some or all switching unit controllers 12 and service providers 14 within switching unit 10 may be hot insertable, hot pluggable, hot swappable, or otherwise readily replaceable during the operation of switching unit 10 to support high availability requirements.

Associated with service providers 14 are input/output (I/O) modules 30 suitable to support incoming and outgoing communications between service providers 14 and associated network interfaces using associated links 32. Protection bus 28 couples I/O modules 30 and generally operates in cooperation with other components of switching unit 10 to provide protection switching and other capabilities desirable in preventing a single point of failure from propagating within switching unit 10 and in satisfying high availability requirements. Protection bus 28 and related components are described in copending U.S. application Ser. No. 09/327, 971. CPU 36 supports suitable software and cooperates with other components of switching unit 10 to facilitate the operation of the present invention. Where appropriate, reference to CPU 36 includes reference to some or all associated software unless otherwise indicated. Furthermore, although a single CPU 36 is illustrated, CPU 36 may include multiple CPUs, microprocessors, or other computers that are distributed, in whole or in part, among some or all of the cards in switching unit 10.

One or more switching unit controllers 12 within a particular switching unit 10 may be coupled using network 34 to one or more switching unit controllers 12 within other switching units 10, one or more associated host computers, or one or more other network components, in any suitable combination. Network 34 may be a shared or dedicated local area network (LAN) supporting Ethernet or any other communications protocol, a suitable wide area network (WAN), or any other appropriate network. In one embodiment, network 34 supports a secure 100BaseT Ethernet link and one or more higher level protocols, for example, TCP/IP (Transmission Control Protocol/Internet Protocol), UDP/IP (User Datagram Protocol/Internet Protocol), or another appropriate protocol. A service provider 14 needing to communicate with a service provider 14 located in another switching unit 10 does so using one of its associated switching unit controllers 12 as a gateway to network 34. Switching unit controller 12 collects and buffers message packets from service provider 14, reformats the message packets as appropriate, and transmits the message packets to a switching unit controller 12 in the switching unit 10 associated with the destination service provider 14.

In general, reset bus 16a allows one or more switching unit controllers 12 to selectively reset one, some, or all service providers 14 if switching unit controller 12, at the instruction of another component of switching unit 10 or independently, determines that selected service providers 14 need to be reset. In one embodiment, reset bus 16a is "wired ored," having an open collector output, to allow both switching unit controllers 12 to access reset bus 16a as appropriate. Reset bus 16a is protected from single points of failure according to the event enabling procedure of the present invention, which for reset bus 16a requires a reset event to be appropriately enabled before the reset event is initiated. Switching unit controller 12 transmits a reset code, having a reset code value, and an enabling reset strobe signal to at least each of the selected service providers 14 using reset bus 16a. In one embodiment, switching unit controller 12 drives the reset code out onto reset bus 16a, reads back or otherwise determines the reset code value on reset bus 16a, and transmits the reset strobe signal only if the driven reset code value matches the determined reset code value. If these values do not match, switching unit controller 12 reports an error to CPU 36. Separate integrated circuits within switching unit controller 12 may independently transmit the reset code value and the reset strobe signal, helping to prevent a fault associated with a single one of the integrated circuits from undesirably initiating a reset event.

Figure 2A:
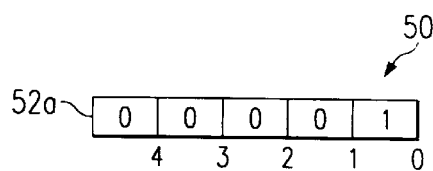
FIGS. 2A through 2C illustrate exemplary reset, isolate, and power codes according to the present invention.
Figure 2A:
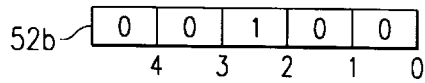

In a particular embodiment, the reset code for each particular service provider 14 is a five bit code containing the slot address of service provider 14 within switching unit 10, although the present invention contemplates any suitable code length and addressing scheme according to particular needs. For example, where the reset code is five bits in length, up to thirty-two unique slot addresses for thirty-two service providers 14 may be supported since each bit may have either a "0" or a "1" value. A "global" or broadcast value may also be supported for situations in which all service providers 14 are to reset substantially simultaneously. A default value may correspond to all service providers 14 being "pulled up" on backplane 22 and operating as intended to switch digital signals associated with switching unit 10. In a particular embodiment, where the reset code is five bits long, slot address values may range from "00001b" to "11110b," the broadcast value may be "00000b," and the default value may be "11111b," although as discussed above the present invention contemplates any appropriate code length and addressing scheme. As an example and as illustrated in FIG. 2A, to reset the first, fourth, and eleventh service providers 14 of switching unit 10, switching unit controller 12 might transmit corresponding "00001b," "00100b," and "01011b" reset codes values to at least these service providers 14 using reset bus 16a.

Each service provider 14 includes logic and associated memory suitable to store its slot address and to compare the reset code received from switching unit controller 12 with its stored slot address, as each bit of the reset code is received, after all bits of the reset code have been received, or in any other suitable manner. Each service provider 14 may also store, and compare with the received reset code value, the five bit or other broadcast value. If logic within service provider 14 determines that the received reset code value matches either its stored slot address value or the stored broadcast value, service provider 14 will reset itself—provided that the switching unit controller 12 has also transmitted the reset strobe signal to enable the event. If the reset strobe signal has not been transmitted, service provider 14 determines this, cannot execute the event, and reports an error associated with reset bus 16a to CPU 36, to one or both switching unit controllers 12, or to any other suitable component of switching unit 10.

Isolate bus 16b allows one or more switching unit controllers 12 to electrically isolate one or more selected service providers 14 if switching unit controller 12, at the instruction of another component of switching unit 10 or independently, determines the selected service providers 14 need to be isolated, for example, in response to failure of the selected service providers 14. In one embodiment, isolate bus 16b is "wired ored," having an open collector output, to allow both switching unit controllers 12 to access isolate bus 16b as appropriate. Similar to reset bus 16a, isolate bus 16b is protected from single points of failure according to an event enabling procedure, which for isolate bus 16b requires an isolate event to be suitably enabled before it can be initiated. Switching unit controller 12 transmits an isolate code signal, having an isolate code value, and an enabling isolate strobe signal to at least each selected service provider 14 using isolate bus 16b.

In one embodiment, switching unit controller 12 drives the isolate code out onto isolate bus 16b, reads back or otherwise determines an isolate code value on isolate bus 16b, and transmits the isolate strobe signal only if the driven isolate code value matches the determined isolate code value. If the values do not match, switching unit controller 12 reports an error to CPU 36. Separate integrated circuits in switching unit controller 12 may independently transmit the isolate code signal and isolate strobe signal, helping to prevent a fault associated with a single one of the integrated circuits from undesirably isolating one or more service providers 14. In one embodiment, each service provider 14 is coupled to tri-state controls of drivers associated with control bus 18 and backplane 22, and may tri-state these control bus and backplane drivers to electrically isolate itself in response to a suitably enabled isolate command from either one of the switching unit controllers 12.

In a particular embodiment, each bit of the isolate code corresponds to the slot location of a particular service provider 14 in switching unit 10, although any suitable code length and addressing scheme may be used according to particular needs. In one embodiment, the bit corresponding to each service provider 14 in the isolate code will have a "0" bit value unless the service provider 14 is to be isolated, in which case its corresponding bit will have a "1" value. The present invention of course contemplates "0" and "1" bit values having opposite indications. As for reset bus 16a, a "global" or broadcast value may be supported for situations in which all service providers 14 are to be isolated substantially simultaneously. A default value may correspond to all service providers 14 being "pulled up" on backplane 22 and operating as intended to switch digital signals associated with switching unit 10. In a particular embodiment, where the isolate code is twenty-one bits in length and one or more selected service providers are to be isolated, the isolate code values may range from "1FFFFEh" to "000001h." Also for a twenty-one bit isolate code, the broadcast value may be "000000h" and the default value may be "1FFFTFh," although as discussed above any suitable code length and addressing scheme may be employed. As an example, to electrically isolate the first, fourth, and eleventh of twenty-one service providers 14 in switching unit 10, switching unit controller 12 may transmit to all service providers 14 the isolate code illustrated in FIG. 2B using isolate bus 16b.

Each service provider 14 includes logic and associated memory suitable to store or otherwise determine its slot location and to compare at least its corresponding bit of the isolate code received from switching unit controller 12 with its slot location. In one embodiment, a particular service provider 14 may not need to determine whether other service providers 14 are being isolated and may not need to concern itself with any bit values of the isolate code other than its own corresponding bit value. If logic within service provider 14 determines that its corresponding bit value of the received isolate code is "1," indicating service provider 14 is to be isolated, service provider 14 isolates itself under the control of CPU 36 or otherwise—provided that switching unit controller 12 has also transmitted the isolate strobe signal to enable the event to be executed. In one embodiment, the reset logic of service provider 14 remains functional even if service provider 14 has been isolated, allowing service provider 14 to be returned to service if appropriate. If switching unit controller 12 has not also transmitted the isolate strobe signal, service provider 14 determines this, is unable to execute the isolate event, and reports an error associated with isolate bus 16b to CPU 36, one or both switching unit controllers 12, or any other suitable component of switching unit 10.

Power bus 16c allows one or more switching unit controllers 12 to power on or power off one or more selected service providers 14 if a switching unit controller 12, either independently or at the instruction of another component of switching unit 10, determines such is appropriate, for example, in response to failure of the selected service providers 14. In one embodiment, like reset bus 16a and isolate bus 16b, power bus 16c is "wired ored," with an open collector output, to allow both switching unit controllers 12 to access power bus 16c as appropriate. Also like reset bus 16a and isolate bus 16b, power bus 16c is protected from single points of failure according to an event enabling procedure, which for power bus 16c requires a power event to be appropriately enabled before it can be initiated. Switching unit controller 12 transmits a power code signal, having a power code value, and an enabling power strobe signal to at least each selected service provider 14 using power bus 16c.

In one embodiment, switching unit controller 12 drives the power code out onto power bus 16c, reads back or otherwise determines the power code value on power bus 16c, and transmits the power strobe signal only if the driven power code value matches the determined power code value. If the values do not match, switching unit controller 12 reports an error to CPU 36. In one embodiment, the power code value indicates that the selected service providers need to transition their current power state; that is, either power on from a current off state or power off from a current on state. As for reset bus 16a and isolate bus 16b, separate integrated circuits within switching unit controller 12 may independently transmit the power code signal and power strobe signal, helping to prevent a fault associated with a single one of the integrated circuits from undesirably transitioning one or more service providers 14.

Power bus 16c may operate substantially similar to reset bus 16a or may operate substantially similar to isolate bus 16b. In one embodiment, power bus 16c operates in substantially the same manner as does isolate bus 16b, with each bit of the power code corresponding to the slot location of a particular service provider 14 and having a "0" value unless the service provider 14 is to be powered on or powered off, in which case its corresponding bit will have a "1" value. The present invention contemplates "0" and "1" bit values having opposite indications. As for isolate bus 16b, broadcast and default values may also be supported. Each service provider 14 includes logic and associated memory suitable to store or otherwise determine its slot location and to compare at least its corresponding bit of the power code received from switching unit controller 12 with its slot location. In one embodiment, a particular service provider 14 may not need to determine whether other service providers 14 are being powered on or off and may not need to concern itself with any bit values of the power code other than its own.

Figure 2B:
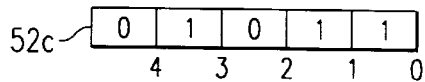
Figure 2B:
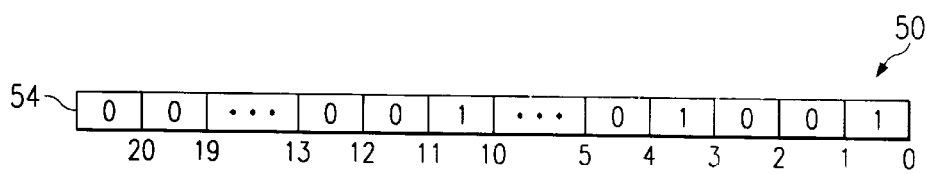
Figure 2C:
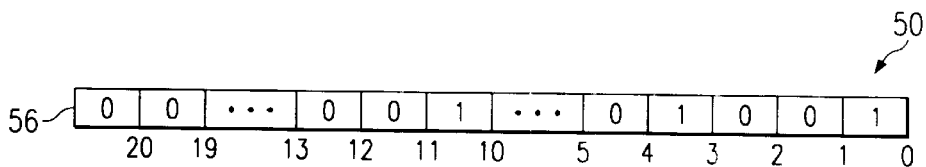

As an example, to transition the power state of the first, fourth, and eleventh of twenty-one service providers 14 in switching unit 10, switching unit controller 12 may transmit to each service provider 14 the power code illustrated in FIG. 2C using power bus 16c. If logic within service provider 14 determines that a corresponding bit value of the received power code is "1," indicating service provider 14 is to be powered on or power off, service provider 14 executes the power event under control of CPU 36 or otherwise—provided that the switching unit controller 12 has also transmitted the power strobe signal to enable the event. If the switching unit controller 12 has not also transmitted the power strobe signal, service provider 14 determines this, is therefore unable to execute the power event, and reports an error associated with power bus 16c to CPU 36, one or both switching unit controllers 12, or any other suitable component of switching unit 10.

FIGS. 2A through 2C illustrate exemplary event codes 50 according to the present invention. As described above, FIG. 2A illustrates exemplary reset codes 52a, 52b, and 52c corresponding respectively to the first, fourth, and eleventh of twenty-one or any other total number of service providers 14 in a particular implementation of switching unit 10. Also as described above, FIG. 2B illustrates exemplary isolate code 54 indicating the first, fourth, and eleventh of twenty-one service providers 14 in a particular implementation of switching unit 10 are to be electrically isolated from at least all other service providers 14. Further as described above, FIG. 2C illustrates exemplary power code 52b indicating that the first, fourth, and eleventh of twenty-one service providers 14 within a particular implementation of switching unit 10 are to be powered on or powered off as appropriate. Reset codes 52, isolate codes 54, and power codes 56 are transmitted to selected service providers 14 using reset bus 16a, isolate bus 16b, and power bus 16c, respectively, during operation of switching unit 10.

Figure 3:
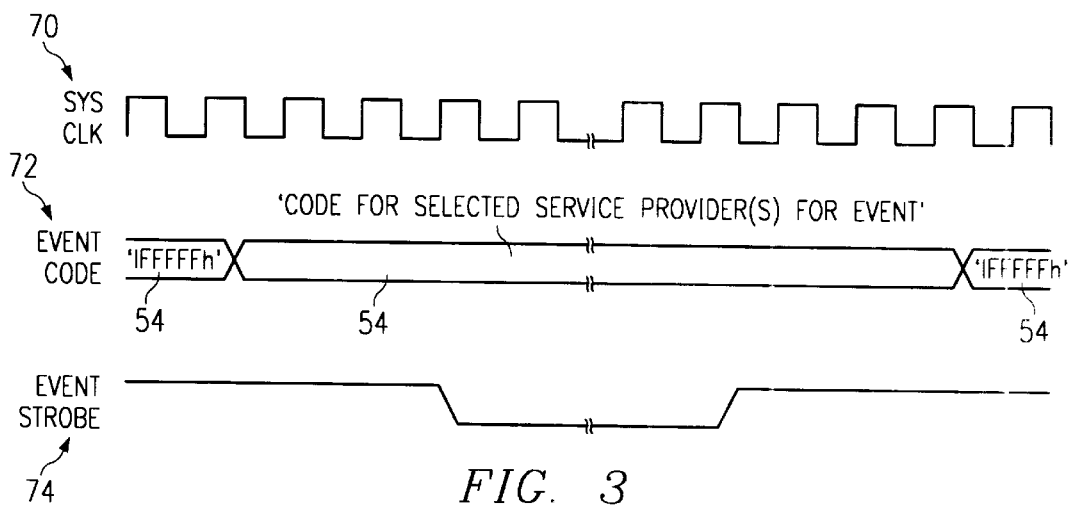
FIG. 3 illustrates exemplary timing for an event initiation bus according to the present invention.

FIG. 3 illustrates exemplary timing for a particular event initiation bus 16 according to the present invention. As discussed above, event initiation bus 16 may be reset bus 16a, isolate bus 16b, or power bus 16c as appropriate. In one embodiment, operations on event initiation buses 16 are synchronous with at least one system clock signal (SYS CLK) 70 generated at a switching unit controller 12 or elsewhere internal or external to switching unit 10. Clock generation, synchronization, and associated fault protection within switching unit 10 are described in copending U.S. application Ser. No. 09/330,433. Switching unit controller 12 transmits event code signal 72 synchronous with system clock signal 70 using event initiation bus 16. In one embodiment, event code signal 72 is transmitted substantially continuously during operation of switching unit 10, but communicates different event codes 50 at different times according to the operation of switching unit 10. For example, event code signal 72 may communicate a default valued event code 50 until an event is to be initiated, begin communicating an event code 50 suitable to initiate the event with respect to one or more selected service providers 14, and after initiation of the event or an appropriate number of clock cycles begin communicating the default valued event code 50 again.

In FIG. 3, as an example only and not by way of limitation, default valued isolate code 54 is communicated on isolate bus 16*b* until switching unit controller 12 communicates isolate code 54 suitable to isolate one or more selected service providers 14. After isolation of service providers 14 or an appropriate time period, switching unit controller 12 again communicates default valued isolate code 54 until the next isolation event is to be initiated. Upon receiving default valued isolate code 54 and an enabling isolate strobe signal 74, selected service providers 14 cease their isolation, if appropriate, and resume normal operation. Event code signal 72 may operate similarly with respect to reset code 52 and reset bus 16*a*, power code 56 and power bus 16*c*, and any other suitable event code 50 and corresponding event initiation bus 16. As discussed above, in one embodiment an event must be enabled using strobe signal 74 before any service provider 14 is able to execute the event. Switching unit controller 12 may transmit strobe signal 74 only to selected service providers 14 associated with the event to be executed or may transmit strobe signal 74 to all service providers 14 coupled to event initiation bus 16. Although strobe signal 74 may have any appropriate temporal relationship with corresponding event code signal 72, in one embodiment strobe signal 74 must at least partially overlap event code signal 72 for the associated event to be enabled. Strobe signal 74 may include one or more component strobe signals 74 and may have any suitable duration.

In one embodiment, once executed in response to an appropriate event code 50 and strobe signal 74, an event becomes locked until service provider 14 receives another event code 50 and strobe signal 74 to release the event. Service provider 14 may latch or otherwise store event code 50 to maintain the event until the releasing event code 50 and associated strobe signal 74 are received. In the time period between the event being locked and released, switching unit controller 12 may communicate the default valued event code 50 essentially to maintain the status quo. For example, for isolate bus 16*b*, service provider 14 may isolate itself in response to isolate code 54 and isolate strobe signal 74, maintain isolation in response to receiving one or more default valued isolate codes 54, and cease its isolation only in response to a releasing isolate code 54 and associated strobe signal 74. Similarly, for power bus 16*c*, service provider 14 may power on in response to power code 56 and power strobe signal 74, maintain its power on in response to receiving one or more default valued power codes 54, and power off only in response to a releasing power code 54 and associated strobe signal 74. As a result, an enabling strobe signal 74 must be received for service provider 14 to transition from a current event state or otherwise take on a new event.

Figure 4:
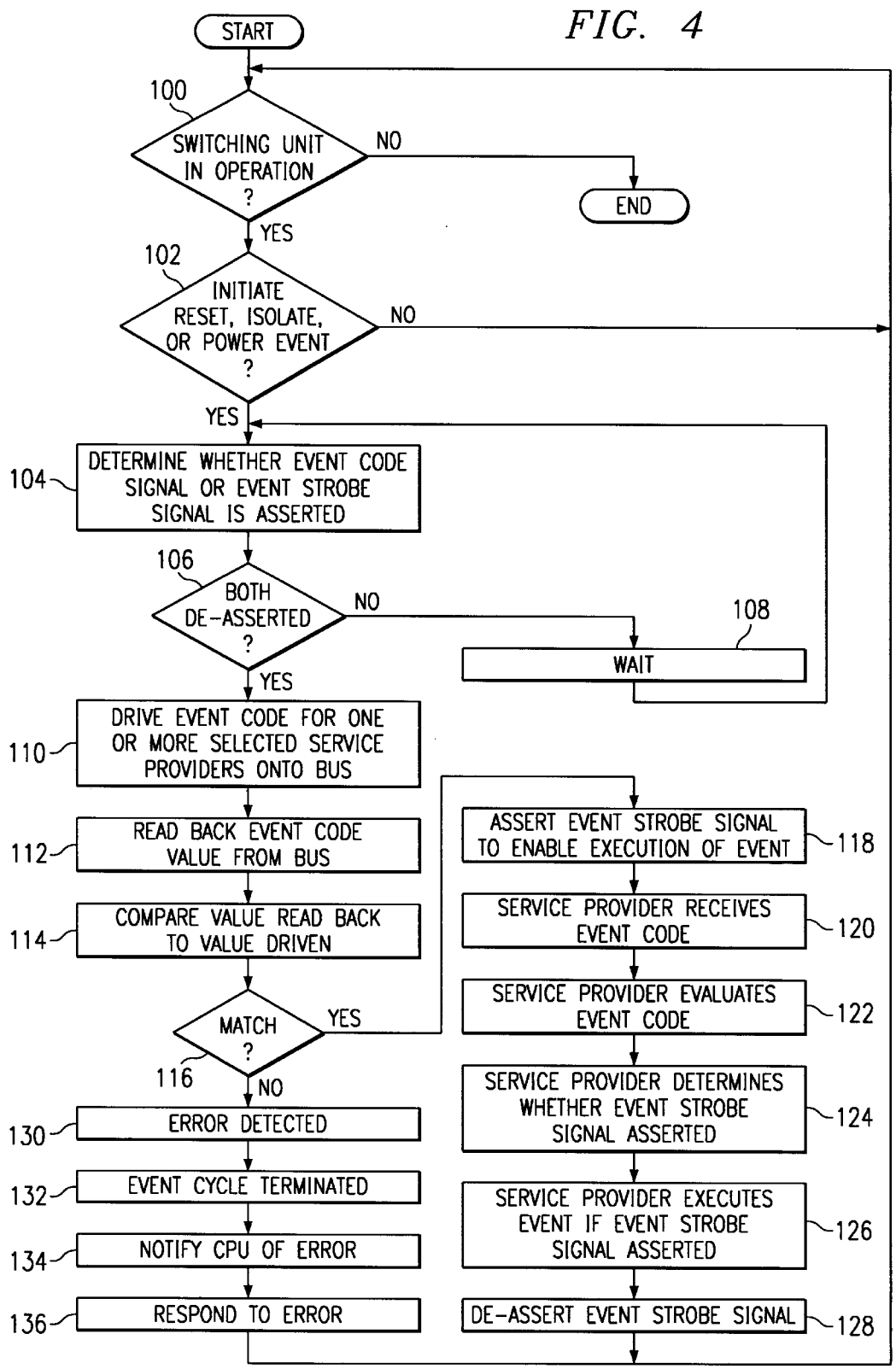
FIG. 4 is a flow chart that illustrates an exemplary method of executing an event according to the present invention.

FIG. 4 is a flow chart illustrating an exemplary method of initiating an event in accordance with the present invention. The method begins at step 100, where service providers 14 within switching unit 10 are operating as intended to switch digital signals associated with one or more corresponding networks. Where switching unit 10 supports redundant switching unit controllers 12, CPU 36 or another suitable component of switching unit 10 may designate a particular switching unit controller 12 as the master, with the other switching unit controller 12 being the slave. Designation of the master may occur at any appropriate time prior to, during, or after initialization of switching unit 10. The method is described with respect to the master switching unit controller 12, which in general could be either redundant switching unit controller 12 according to operation of switching unit 10. If no reset, isolate, or power event needs to be initiated at step 102, the method returns to step 100 and switching unit 10 continues to operate as intended.

If switching unit controller 12 determines at step 102 that it needs to initiate a reset, isolate, or power event, switching unit controller 12 evaluates the corresponding event initiation bus 16 at step 104 to determine whether event code signal 72 or event strobe signal 74 is being asserted, such that event initiation bus 16 is busy or otherwise unavailable. If either event code signal 72 or event strobe signal 74 is being asserted at step 106, switching unit controller 12 waits for a predetermined or other suitable time period at step 106 and the method returns to step 104 for another evaluation of event initiation bus 16. If both event code signal 72 and event strobe signal 74 are de-asserted at step 106, switching unit controller 12 may assert event code signal 72 to drive the appropriate event code 50 for one or more selected service providers 14 out onto event initiation bus 16 at step 110. The present invention contemplates de-assertion of event code signal 72 encompassing communication of default valued event code 50. In one embodiment, switching unit controller 12 must arbitrate with the other switching unit controller 12 for use of event initiation bus 16 before asserting event code signal 72 at step 110.

Switching unit controller 12 reads back or otherwise determines the value for event code 50 on event initiation bus 16 at step 112 and, at step 114, compares the event code value read back from event initiation bus 16 with the event code value driven out onto event initiation bus 16. If the values match at step 116, switching unit controller asserts event strobe signal 74 at step 118 to enable the execution of the desired event. At step 120, at least selected service providers 14 receive event code 50 and, at step 122, each selected service provider 14 evaluates receive code 50 to determine whether the service provider 14 is to execute the event corresponding to event initiation bus 16. The valuation of event code 50 may include comparing the value of event code 50 with the slot address, or a value indicating the slot address, of service provider 14 or any other evaluation suitable to allow service provider 14 to determine whether it is to execute the event. The present invention contemplates the mere transmission of event code 50 over event initiation bus 16 to service provider 14 indicating to service provider 14 that it is to execute the event. At step 124, each selected service provider 14 determines whether event strobe signal 74 has been transmitted, simultaneous with or in any other suitable temporal relationship to event code signal 72, and at step 126, if event strobe signal 74 has been asserted, each selected service provider 14 executes the event. As described above, if event strobe signal 74 is not asserted, each selected service provider 14 reports an error associated with event initiation bus 16 to CPU 36, one or both switching unit controllers 12, or any other suitable component of switching unit 10.

After the event has been executed at step 126, or at any other appropriate time, switching unit controller 12 de-asserts event strobe signal 74 at step 128, and the method returns to step 100. If at step 116, the event code value read back from event initiation bus 16 does not match the event code value driven onto event initiation bus 16, switching unit controller 12 detects an error at step 130, the event cycle is terminated at step 132, and switching unit controller 12 notifies CPU 36 of the error at step 134. After software associated with CPU 36, a human associated with switching unit 10, or any other entity suitably responds to the error at step 136, the method returns to step 100. The method loops in this manner during operation of switching unit 10, reliably initiating events at one or more selected service providers 14 while helping to prevent undesirable initiation of events in response to a failure associated with event initiation bus 16, an integrated circuit or other component of switching unit controller 12, or other suitable component of switching unit 10. Significantly, the present invention accomplishes these benefits without requiring a redundant event initiation bus 16, providing an important technical advantage over previous techniques.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A telecommunications device, comprising:
   an event initiation bus;
   at least one card coupled to the bus and operable to execute an event;
   at least one controller coupled to the bus and operable to communicate an event code value to the card using the bus, the event code value indicating that the event is to be executed, the controller operable to determine an event code value from the bus and to compare the communicated event code value with the determined event code value, the controller operable to transmit an event strobe signal to the card using the bus if the communicated event code value matches the determined event code value, the event strobe signal enabling execution of the event, the card operable to execute the event in response to the event code value and the event strobe signal.

2. The device of claim 1, wherein the device is a switching unit having a high availability backplane environment.

3. The device of claim 1, wherein:
   the event initiation bus is selected from the group consisting of a reset bus, an isolate bus, and a power bus; and
   the event is selected from the group consisting of:
      a reset event in which the card resets itself;
      an isolate event in which the card electrically isolates itself from other cards coupled to the bus; and
      and a power event in which the card transitions its power state.

4. The device of claim 1, wherein the card is one of a plurality of cards coupled to the bus, each card operable to receive the event code value, the event code value specifying one or more selected cards that are to execute the event according to corresponding slot addresses of the selected cards.

5. The device of claim 1, wherein the controller communicates a default event code value until execution of the event is to be initiated, communicates the event code value to initiate execution of the event, and communicates the default event code value in response to execution of the event.

6. The device of claim 1, wherein:
   the controller detects an error associated with the bus if the communicated event code value does not match the determined event code value;
   the controller does not transmit the event strobe signal if the error is detected; and
   the card does not execute the event unless the card receives both the event code value and the event strobe signal.

7. The device of claim 1, wherein the controller comprises:
   a first integrated circuit operable to communicate the event code value; and
   a second integrated circuit physically separate from the first integrated circuit and operable to communicate the event strobe signal, wherein failure of one of the integrated circuits cannot cause the card to execute the event.

8. A controller operable to be coupled to an event initiation bus within a telecommunications device, the device comprising at least one card coupled to the bus and operable to execute an event, wherein:
   the controller is operable to communicate an event code value to the card using the bus, the event code value indicating that the event is to be executed;
   the controller is operable to determine an event code value from the bus and to compare the communicated event code value with the determined event code value; and
   the controller is operable to transmit an event strobe signal to the card using the bus if the communicated event code value matches the determined event code value, the event strobe signal enabling the card to execute the event in response to receiving the event code value.

9. The controller of claim 8, wherein the device is a switching unit having a high availability backplane environment.

10. The controller of claim 8, wherein the event is selected from the group consisting of:
    a reset event in which the card resets itself,
    an isolate event in which the card electrically isolates itself from other cards coupled to the bus; and
    and a power event in which the card transitions its power state.

11. The controller of claim 8, wherein the card is one of a plurality of cards coupled to the bus, the controller operable to communicate the event code value to each card, the event code value specifying one or more selected cards that are to execute the event according to corresponding slot addresses of the selected cards.

12. The controller of claim 8, wherein:
    the controller detects an error associated with the bus if the communicated event code value does not match the determined event code value;
    the controller does not transmit the event strobe signal if the error is detected; and
    the card does not execute the event unless the card receives both the event code value and the event strobe signal.

13. The controller of claim 8, wherein the controller comprises:
    a first integrated circuit operable to communicate the event code value; and
    a second integrated circuit physically separate from the first integrated circuit and operable to communicate the event strobe signal, wherein failure of one of the integrated circuits cannot cause the card to execute the event.

14. A method for executing an event at a card coupled to an event initiation bus within a telecommunications device having, comprising:
    communicating an event code value to the card using the bus, the event code value indicating that the event is to be executed;

determining an event code value from the bus;

comparing the communicated event code value with the determined event code value;

transmitting an event strobe signal to the card using the bus if the communicated event code value matches the determined event code value;

enabling execution of the event using the event strobe signal; and execute the event at the card in response to the event code value and the event strobe signal.

15. The method of claim 14, wherein the device is a switching unit having a high availability backplane environment.

16. The method of claim 14, wherein executing the event is selected from the group consisting of:

the card resetting itself;

the card electrically isolating itself from other cards coupled to the bus; and the card transitioning its power state.

17. The method of claim 14, wherein the card is one of a plurality of cards coupled to the bus, the method further comprising:

specifying one or more selected cards that are to execute the event according to corresponding slot addresses of the selected cards;

each card receiving the event code value; and the selected cards executing the event in response to the event code value and the event strobe signal.

18. The method of claim 14, further comprising:

communicating a default event code value until execution of the event is to be initiated;

communicating the event code value to initiate execution of the event; and communicating the default event code value in response to the execution of the event.

19. The method of claim 14, further comprising:

detecting an error associated with the bus if the communicated event code value does not match the determined event code value;

preventing the event strobe signal from being transmitted if the error is detected; and preventing the card from executing the event unless the card receives both the event code value and the event strobe signal.

20. The method of claim 14, further comprising:

communicating the event code value from a first integrated circuit; and communicating the event strobe signal from a second integrated circuit that is physically separate from the first integrated circuit; and preventing the card from executing the event in response to failure of one of the integrated circuits.

* * * * *